United States Patent
Waywell et al.

[15] 3,699,180
[45] Oct. 17, 1972

[54] ISOMERIZATION OF DIHYDRONAPHTHALENES

[72] Inventors: David R. Waywell, Lisle, Ill.; Charles T. West, Manhattan, Kans.

[73] Assignee: Standard Oil Company, Chicago, Ill.

[22] Filed: May 26, 1971

[21] Appl. No.: 147,269

[52] U.S. Cl. ............................................260/668 F
[51] Int. Cl. ..............................................C07c 15/24
[58] Field of Search ...................................260/668 F

[56] References Cited

OTHER PUBLICATIONS

Strauss et al., Chemische Berichte, Vol. 46, page 232 QD1.D4

Primary Examiner—Delbert E. Gantz
Assistant Examiner—C. E. Spresser
Attorney—Arthur G. Gilkes, William T. McClain and Philip Hill

[57] ABSTRACT

An improved method for conversion of 1,4-dihydronaphthalene to the corresponding 1,2-dihydro isomer employs as catalyst an alkali metal hydroxide in a polar solvent, preferably isopropyl alcohol. At moderate temperatures, ranging from 60° to 100° C., the 1,2-dihydro isomer is obtained directly in sufficient purity for use in the synthesis of polymers and plastic materials.

6 Claims, No Drawings

ISOMERIZATION OF DIHYDRONAPHTHALENES

BACKGROUND OF THE INVENTION

The reduction of naphthalene and its derivatives has long been known to proceed readily to at least the tetrahydro stage. Tetralin has historically been produced by both chemical and electro-chemical means. The classic chemical reduction is known as the Bouveault-Blanc reaction wherein Tetralin is produced by treatment of naphthalene with sodium metal in ethanol at the reflux point. This hydrogenation reaction proceeds in a step-wise manner so that it has also been possible to obtain a dihydronaphthalene product which consists almost entirely of 1,4-dihydronaphthalene.

The unsaturation of the 1,4-dihydro compound is allylic in nature and for many chemical reactions the 1,2-dihydro isomer, possessing conjugated unsaturation, is preferred. Although 1,2-dihydronaphthalene can be synthesized in other ways, as by dehydration of tetrahydronaphthols, the preferred synthesis involves isomerization of -dihydronaphthalene.

Isomerization has been effected in the past by catalysis with strong alkaline reagents. For example, Strauss et al. have reported in *Chemische Berichte* (Vol. 46 at page 232) the use of a 5 percent solution of sodium ethylate in ethanol at 140°–150° C. but report no yields. Hueckel et al. have reported in *Annalen* (Vol. 540 at page 157) isomerization employing sodamide in liquid ammonia at −70° C. and claim a quantitative conversion but present no yield data. Beets et al. have reported in *Rec. Trav. Chim.* (Vol. 71 at page 343) a 90 percent yield of 1,2-dihydronaphthalene saying only that it was effected by reduction of naphthalene with sodium and a secondary alcohol, e.g., methylisobutylcarbinol, followed by isomerization by heating with potassium hydroxide. Currently 1,2-dihydronaphthalene is very expensive and available only in a technical grade having a purity of 75–80 percent. The technical grade material, contaminated with naphthalene, tetrahydronaphthalene, and a trace amount of 1,4-dihydronaphthalene, cannot be purified by distillation, fractional crystallization or other conventional separation method. There remains a need for a method which will effect substantially quantitative production (greater than 95 percent yield) of the 1,2-isomer without the need for resorting to the use of either extremely high or extremely low reaction temperatures. Without such a method the promising use of 1,2-dihydronaphthalene as a monomer for the preparation of novel polymers and plastics will not be realized.

SUMMARY OF THE INVENTION

One object of our invention is to provide an improved method for the isomerization of 1,4-dihydronaphthalene derivatives to the corresponding 1,2-dihydro isomers.

Another object of our invention is to provide a ready source of 1,2-dihydronaphthalene and derivatives thereof as newly available monomers for use in the preparation of unique polymers, co-polymers and plastic compositions.

Our novel isomerization method comprises treatment of a selected 1,4-dihydronaphthalene in the presence of a saturated solution of a strong alkaline reagent such as potassium hydroxide in an alcohol such as isopropyl alcohol. When isopropyl alcohol is employed the isomerization is conveniently effected under reflux conditions at about 90° to 95° C.

DESCRIPTION OF THE INVENTION

Our invention consists of an improved method for the conversion of 1,4-dihydronaphthalenes to the corresponding 1,2-dihydronaphthalenes employing a strong alkaline catalyst. Our improved method permits the conversion to occur substantially quantitatively without resort to the use of extreme reaction temperatures. We employ a strongly alkaline reagent such as an alkali metal hydroxide dissolved in a suitable polar solvent. The isomerization is effected with mild heating at temperatures well within the range where ordinary steam may be employed as the heating medium. The product obtained when employing our improved process comprises at least 95 mol. percent of the desired 1,2-dihydro isomer and usually provides a concentration of about 97 mol. percent. This degree of purity (no more than 3 mol. percent contaminants) has been found to be satisfactory for the polymerization of 1,2-dihydronaphthalenes, either alone or in combination with other reactive monomers, in the preparation of polymeric compositions when employing various conventional catalyst systems.

The 1,4-dihydronaphthalenes employed in our invention may be prepared by any available method such as the Bouveault-Blanc reduction of a suitable naphthalene; for example, alkyl naphthalenes such as 1-methyl naphthalene, 2-methyl naphthalene, 2,6-dimethyl naphthalene, 1-ethyl naphthalene, 2-ethyl naphthalene, and diethyl naphthalenes. We prefer to use the highly pure 1,4-dihydronaphthalenes made available by electro-chemical reduction of the corresponding naphthalene derivative. For example, 1,4-dihydronaphthalene prepared by the electrochemical technique disclosed by J. F. Connolly et al. in U.S. patent application S.N. 23, 466 has a purity of at least 99% with the only identifiable contaminant being naphthalene.

The strong alkaline catalytic component of our reaction system should be an alkali metal hydroxide. Although sodium hydroxide is suitable for this process, we prefer to use potassium hydroxide. In any event the hydroxide selected should contain no more than trace amounts of impurities such as carbonates and only that quantity of water normally present in commercially available solid forms of the alkali metal hydroxide.

The choice of polar solvent for the alkali metal hydroxide should be limited to those polar solvents capable of dissolving a significant amount of said alkali metal hydroxide and also having a boiling point no higher than about 100° C. Among available polar solvents alcohols, such as ethyl alcohol and isopropyl alcohol, are especially suitable and of these we prefer to use isopropyl alcohol. The solution of alkali metal hydroxide in the polar solvent should preferably be saturated at ambient temperature (about 25°–35° C.) and should thereafter be heated to the selected reaction temperature. This temperature should be within the range from about 60° C. to about 100° C. and preferably within the range from about 75° C. to about 95° C.

The 1,4-dihydronaphthalene derivative may be added to the catalyst-solvent system at ambient temperature or more suitably at the selected reaction temperature. In general, the catalyst-solvent system should be employed in an amount ranging from about 1 to about 10 volumes per volume of the selected 1,4-dihydronaphthalene. The mixture thus prepared should be agitated by any conventional means at the selected reaction temperature for a period of time in the range 2 to 20 hours. Progress of the isomerization may be followed by withdrawing a sample at intervals for analysis by gas chromatography. Isomerization will usually be about 95 percent complete within about 5 hours. When a product purity in the range of 97 percent or higher is desired, it is preferred that the isomerization reaction be permitted to proceed for about 8 hours.

The extremely high conversion to a 1,2-dihydronaphthalene is especially important because this makes possible the use of the hydrocarbon product without need for purification. Separation of the dihydro isomers by fractionation methods is essentially impossible and other methods, such as selective complex formation, are inefficient and expensive.

Although our improved method for synthesis of 1,2-dihydronaphthalenes has been developed as a batch reaction, continuous preparation of the desired product may likewise be effected. Various means for accomplishing this will be evident to one skilled in chemical synthesis, including, for example, the use of a pipe reactor with provision for recycling, percolation through a bed of a strongly alkaline stationary phase, and the like.

The potential utility of 1,2-dihydronaphthalene is very great. For example, it is very reactive in forming co-polymers with light olefins in the presence of Friedel-Crafts catalysts, the products exhibiting useful properties as synthetic lubricating oils. It is also reactive under alkali metal catalysis to provide high molecular weight, solid homopolymers. it also serves as a polymer modifier, improving the physical properties of existing polymeric products.

In the synthesis of novel chemical products 1,2-dihydronaphthalene is uniquely valuable as an intermediate for use in oxidation reactions, being capable of providing oxidation products having functional groups attached both to an aromatic ring and to an alkyl carbon chain.

EMBODIMENT OF THE INVENTION

The following experimental results are exemplary of the practice of our invention.

Solid pellets of potassium hydroxide were dissolved in anhydrous isopropyl alcohol at 25° C. until a saturated solution was obtained. A 50 ml. portion of this solution was heated under refluxing conditions (90°–95° C.) and 5 ml. of 1,4-dihydronaphthalene, obtained by electro-chemical reduction of naphthalene, was added thereto. The reaction mixture was maintained under refluxing conditions for 30 hours. At intervals 1 ml. portions of the reaction mixture were removed, cooled to room temperature, washed with water and dilute acid solution, and the isolated hydrocarbon material was analysized by gas chromatography for its content of 1,2-dihydronaphthalene (1,2-DHN), 1,4-dihydronaphthalene (1,4-DHN) and naphthalene. Component analyses in the following table indicate the course of the isomerization with time.

| Sampling time, Minutes | Components, mol.% | | |
| --- | --- | --- | --- |
| | 1,2-DHN | 1,4-DHN | Naphthalene |
| 0 | — | 99.2 | 0.8 |
| 20 | 37 | 62.5 | 0.6 |
| 85 | 49.3 | 50.2 | 0.6 |
| 145 | 70.5 | 27.6 | 0.6 |
| 265 | 91.0 | 8.35 | 0.69 |
| 327 | 94.5 | 4.78 | 0.67 |
| 395 | 95.8 | 3.59 | 0.64 |
| 1425 | 97.5 | 1.92 | 0.7 |
| 1770 | 97.3 | 2.16 | 0.65 |

When the data contained in this table were plotted on linear coordinates, interpolation indicated a yield of 97 mol. percent of 1,2-dihydronaphthalene was obtained after 8 hours.

We claim:

1. An improved process for the isomerization of a 1,4-dihydronaphthalene to a 1,2-dihydronaphthalene, comprising contacting the 1,4-dihydronaphthalene with an alkali metal hydroxide dissolved in a polar solvent, having a normal boiling point no higher than 100° C., at a temperature within the range from about 60° C. to about 100° C. for at least about 2 hours.

2. The process of claim 1 wherein the alkali metal hydroxide is sodium hydroxide or potassium hydroxide.

3. The process of claim 1 wherein the polar solvent is an alcohol.

4. The process of claim 1 wherein a saturated solution of potassium hydroxide in isopropyl alcohol is prepared at room temperature and thereafter contacted with the 1,4-dihydronaphthalene.

5. An improved process for the isomerization of 1,4-dihydronaphthalene to 1,2-dihydronaphthalene in the presence of an alkaline catalyst system, comprising the steps of:
   a. preparing a saturated solution of potassium hydroxide in isopropyl alcohol at ambient temperature;
   b. heating said alcoholic potassium hydroxide solution to a selected temperature within the range from 75° to 95° C.;
   c. adding from about 0.1 to about 1.0 volume of 1,4-dihydronaphthalene to the heated solution;
   d. agitating the mixture of 1,4-dihydronaphthalene and alcoholic potassium hydroxide solution at the selected temperature for a period of time in the range 2 to 20 hours; and
   e. recovering 1,2-dihydronaphthalene from the mixture.

6. The process of claim 5 wherein the selected temperature is in the range from 90° to 95° C. and agitation is continued for about 8 hours.

* * * * *